US008296175B2

(12) United States Patent
Dey et al.

(10) Patent No.: US 8,296,175 B2
(45) Date of Patent: Oct. 23, 2012

(54) SOCIAL NETWORK MARKETING PLAN COMPARISON METHOD AND SYSTEM

(75) Inventors: Kuntal Dey, West Bengal (IN); Natwar Modani, New Delhi (IN); Amit Anil Nanavati, New Delhi (IN); Subramanya Kabbinahithlu Narayana Prasad, Bangalore (IN); Seema Nagar, Rajasthan (IN)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 12/685,206

(22) Filed: Jan. 11, 2010

(65) Prior Publication Data

US 2011/0173046 A1    Jul. 14, 2011

(51) Int. Cl.
*G06F 10/00* (2006.01)
(52) U.S. Cl. .................................. 705/7.29; 705/7.33
(58) Field of Classification Search ................. 705/7.29, 705/7.33, 14.52; 345/440
See application file for complete search history.

(56) References Cited

U.S. PATENT DOCUMENTS

| 6,286,005 | B1 * | 9/2001 | Cannon ................... 705/14.66 |
| 7,080,027 | B2 * | 7/2006 | Luby et al. ................... 705/7.31 |
| 7,526,434 | B2 * | 4/2009 | Sharp ........................... 705/7.29 |
| 2001/0020236 | A1 * | 9/2001 | Cannon ............................. 707/1 |
| 2006/0218008 | A1 | 9/2006 | Cole |
| 2007/0016435 | A1 | 1/2007 | Bevington |
| 2008/0033758 | A1 | 2/2008 | Keeley |
| 2008/0033809 | A1 | 2/2008 | Black et al. |
| 2008/0046317 | A1 * | 2/2008 | Christianson et al. .......... 705/14 |
| 2008/0086369 | A1 | 4/2008 | Kiat et al. |
| 2008/0104225 | A1 * | 5/2008 | Zhang et al. .................. 709/224 |
| 2008/0247534 | A1 | 10/2008 | Steul |
| 2009/0063284 | A1 | 3/2009 | Turpin et al. |
| 2009/0064025 | A1 | 3/2009 | Christ et al. |
| 2009/0144075 | A1 | 6/2009 | Flinn et al. |
| 2009/0182618 | A1 | 7/2009 | Higgins et al. |
| 2009/0204482 | A1 | 8/2009 | Reshef et al. |
| 2010/0306043 | A1 * | 12/2010 | Lindsay et al. ............ 705/14.41 |
| 2011/0153421 | A1 * | 6/2011 | Novikov et al. ........... 705/14.52 |

FOREIGN PATENT DOCUMENTS

| WO | WO2007109726 | 9/2007 |
| WO | WO2008042812 | 4/2008 |
| WO | WO2008083388 | 7/2008 |

OTHER PUBLICATIONS http://www.sdmet.com/article6.html; Using the Value Equation to Evaluate Campaign Effectiveness; 8 pages.

(Continued)

*Primary Examiner* — Beth V Boswell
*Assistant Examiner* — Ernest A Jackson
(74) *Attorney, Agent, or Firm* — Schmeiser, Olsen & Watts; John Pivnichny (57) ABSTRACT

A comparison method and system including retrieving by a computer, first data associated with first interactions between users associated with social networks. The computing system generates a first graph illustrating the first interactions. The computing system identifies targeted users associated with a marketing plan for the users. The computing system enables the marketing plan and retrieves second data associated with second interactions between the users. The computing system generates a second graph illustrating the second interactions, compares the second graph to the first graph, and generates a third graph illustrating first order differences between the first interactions and the second interactions.

20 Claims, 8 Drawing Sheets

OTHER PUBLICATIONS http://digitaldiplomacy.fco.gov.uk/en/campaigns/; 14 pages.
http://people.brunel.ac.uk/~mastjjb/jeb/or/dea.html; 30 pages.
Promotion; pp. 449-450.
Microsoft TechNet; SQL Server 2008 Books Online (Jun. 2009); Key Performance Indicators (KPIs); 3 pages.
Science Direct; Quantitative relationships between key performance indicators for supporting decision-making processes; Computers in Industry; vol. 60, Issue 2, Feb. 2009; 3 pages.
A Statistical Measure of a Population's Propensity to Engage in Post-Purchase Online Word-of-Mouth; Dellarocas et al.; 2006, vol. 21, No. 2, 277-285.
Network-Based Marketing: Identifying Likely Adopters via Consumer Networks; Hill et al.; 2006, vol. 21, No. 2, 256-276.
Evaluation of Key Performance Indicators; Rob Pearson; 4 pages.
Tools; 3 pages.
Quantitative relationships between key performance indicators for supporting decision-making processes http://www.sciencedirect.com/science?_ob=ArticleURL&_udi=B6V2D-4V1D7JJ-1&_user=10&_rdoc=1&_fmt=&_orig=search&_sort=d&view=c&_acct=C000050221&_version=1&_urlVersion=0&_userid=10&md5=add08e88f78ebaee0ddb86404602e884; (no attachment).
Patent application; Dey et al.; Social Network Marketing Plan Monitoring Method and System; U.S. Appl. No. 12/685,170.
Office Action (Mail Date Dec. 9, 2011) for U.S. Appl. No. 12/685,170, filed Jan. 11, 2010; Confirmation No. 6826.

* cited by examiner

SOCIAL NETWORK MARKETING PLAN COMPARISON METHOD AND SYSTEM

This application is related to application Ser. No. 12/685,170 filed on Jan. 11, 2010.

FIELD OF THE INVENTION

The present invention relates to a method and associated system for comparing an effectiveness of multiple social network marketing plans.

BACKGROUND OF THE INVENTION

Monitoring multiple processes typically comprises an inefficient process with little flexibility. Accordingly, there exists a need in the art to overcome at least some of the deficiencies and limitations described herein above.

SUMMARY OF THE INVENTION

The present invention provides a method comprising: retrieving, by a computer processor of a computing system, first data associated with first interactions between users associated with a plurality of social networks; generating, by the computer processor based on the first data, a first graph illustrating the first interactions between the users; identifying, by the computer processor, a group of users of the users, wherein the group of users comprise first targeted users associated with a first marketing plan associated with a first social network of the plurality of social networks; first enabling, by the computer processor, the first marketing plan with respect to the users; after performing the first enabling, retrieving by the computer processor, second data associated with second interactions between the users; generating, by the computer processor based on the second data, a second graph illustrating the second interactions between the users; comparing, by the computer processor, the second graph to the first graph; generating, by the computer processor based on the comparing the second graph to the first graph, a third graph illustrating first order differences between the first interaction and the second interactions with respect to the group of users; analyzing, by the computer processor, the third graph; and storing, by the computer processor, results of the analyzing the third graph.

The present invention provides a computing system comprising a computer processor coupled to a computer-readable memory unit, the memory unit comprising instructions that when enabled by the computer processor implements a comparison method comprising: retrieving, by the computer processor, first data associated with first interactions between users associated with a plurality of social networks; generating, by the computer processor based on the first data, a first graph illustrating the first interactions between the users; identifying, by the computer processor, a group of users of the users, wherein the group of users comprise first targeted users associated with a first marketing plan associated with a first social network of the plurality of social networks; first enabling, by the computer processor, the first marketing plan with respect to the users; after performing the first enabling, retrieving by the computer processor, second data associated with second interactions between the users; generating, by the computer processor based on the second data, a second graph illustrating the second interactions between the users; comparing, by the computer processor, the second graph to the first graph; generating, by the computer processor based on the comparing the first graph to the second graph, a third graph illustrating first order differences between the first interaction and the second interactions with respect to the group of users; analyzing, by the computer processor, the third graph; and storing, by the computer processor, results of the analyzing the third graph.

The present invention advantageously provides a simple method and associated system capable of monitoring multiple processes.

BRIEF DESCRIPTION OF THE DRAWINGS

FIG. 4 including

DETAILED DESCRIPTION OF THE INVENTION

Figure 1:
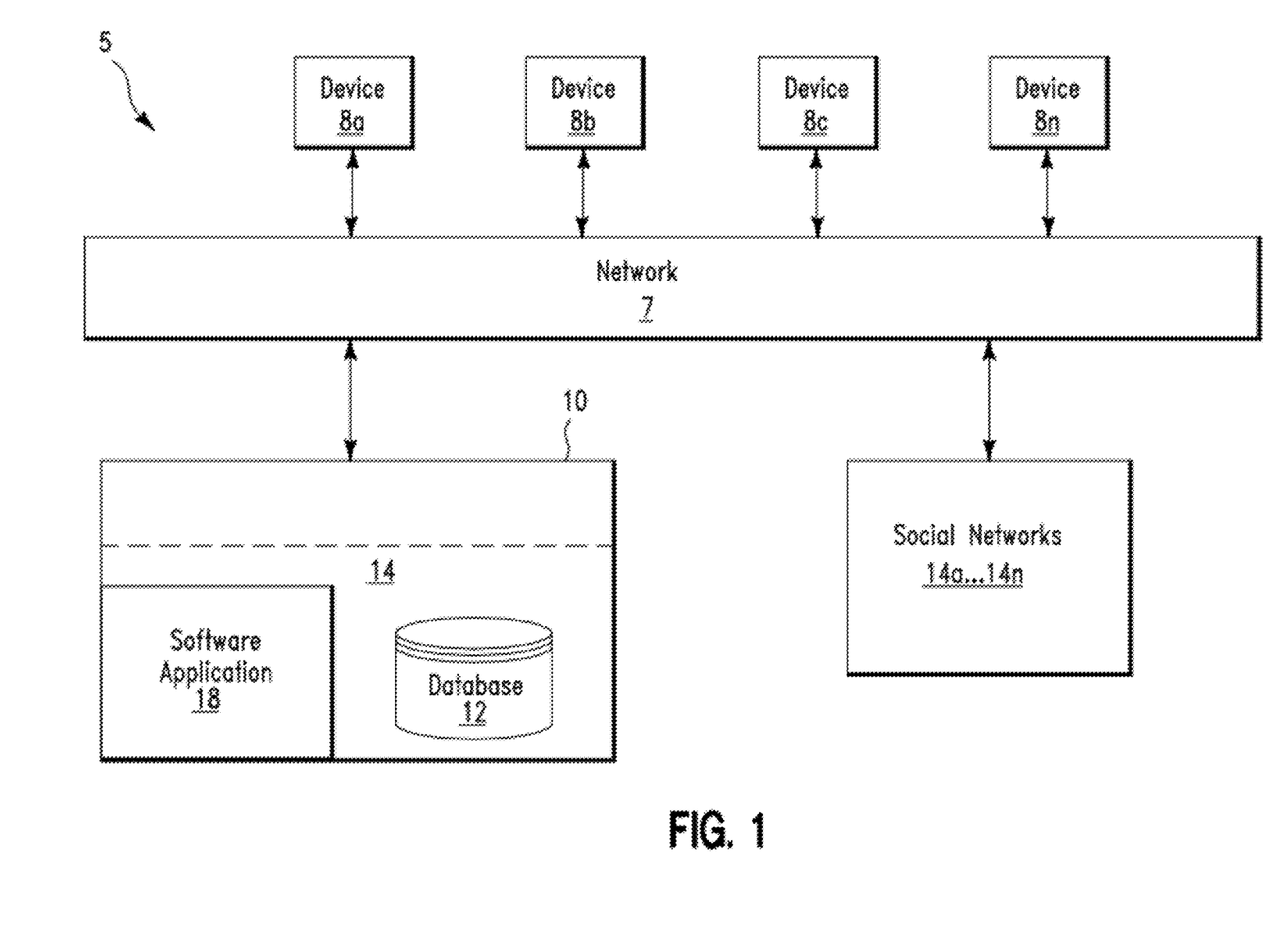
FIG. 1 illustrates a system comparing an effectiveness of multiple social network marketing plans, in accordance with embodiments of the present invention

FIG. 1 illustrates a system 5 comparing an effectiveness of multiple social network marketing plans, in accordance with embodiments of the present invention. System 2 enables a method for indentifying key performance indicators (KPI) that are associated with social network marketing plans. Additionally, system 2 generates multiple graphs representing interactions between consumers (of social networks) before and after enabling multiple social network marketing plans. A social network (e.g., social networks 14a . . . 14n of FIG. 1) is defined herein as a social structure comprising individuals (or organizations) that may be referred to as nodes. The nodes are connected to each other by one or more specific types of interdependency such as, inter alia, friendship, family, interests, beliefs, knowledge, etc. A social network may comprise any type of devices linked together including, inter alia, a telephone network, a computer network, etc. A KPI is defined herein as a tool allowing an organization to define and measure progress towards organizational goals. A KPI comprises a number used to measure and express business impacts in terms of financial and social network parameters.

System 5 of FIG. 1 comprises devices 8a . . . 8n and social networks 14a . . . 14n connected through a network 7 to a computing system 10. Network 7 may comprise any type of network including, inter alia, a telephone network, a cellular telephone network, a local area network, (LAN), a wide area network (WAN), the Internet, etc. Devices 8a . . . 8n may comprise any type of devices capable of implementing a social network including, inter alia, a telephone, a cellular telephone, a digital assistant (PDA), a video game system, an audio/video player, a personal computer, a laptop computer, a computer terminal, etc. Each of devices 8a . . . 8n may comprise a single device or a plurality of devices. Devices 8a . . . 8n are used by end users for communicating with each other (i.e., via social networks 14a . . . 14n) and computing system 10. Computing system 10 may comprise any type of computing system(s) including, inter alia, a personal computer (PC), a server computer, a database computer, etc. Computing system 10 is used to generate graph for comparing an effectiveness of multiple social network marketing plans implemented using devices 8a . . . 8n. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved and calculated data associated with comparing an effectiveness of multiple social network marketing plans. Software application 18 enables a method to compare an effectiveness of multiple social network marketing plans. Social networks 14a . . . 14n may comprise any number and any type of different social network systems associated with any type of social networks. Software application 18 enables the following functionality associated with comparing an effectiveness of multiple social network marketing plans:

1. Construct a social network graph(s) identifying interactions among customers before enabling a social network marketing plan.
2. Identify (i.e., on the graph) target customer for each marketing plan (e.g., with a unique marker). For example, a customer that is a target for multiple social network marketing plans may be marked with multiple styles.
3. Enable a social network marketing plans and generate a social network graph after enabling a social network marketing plan. Steps 1-3 are repeated for multiple social network marketing plans.
4. Compare and analyze social network graphs before and after enabling social network marketing plans. The analysis indicates:
   A. First order differences indicating effects of a single social network marketing plan.
   B. Second order differences comparing effects of two different social network marketing plans.
   C. Third order differences comparing effects of two pairs of social network marketing plans.
5. Analyze correlations between multiple target customers in order to identify interferences between two social network marketing plans.
6. Construct a social network marketing plan relationship map graphically representing relationships among analyzed social network marketing plans.

The aforementioned steps enable a systematic analysis of effects of a single or multiple social network marketing plans, interferences and inter-relationships between social network marketing plans, and measurement of an extent of interference.

Software application 18 comprises the following three components for comparing an effectiveness of multiple social network marketing plans:
1. A social network analyzer component that processes user interaction records and identifies a social network associated with each user.
2. A spec normalizer component that reconciles and standardizes terminology used by different marketing plan specs. The spec normalizer component uses an ontology map to identify synonyms and antonyms. For example, cost effective=value, premium=expensive, price sensitive< >value sensitive, budget< >premium, etc.
3. A marketing plan analyzer component that: compares social network graphs before and after enabling a marketing plan in order to measure an effect of the marketing plan(s), analyzes marketing plan target "styles" to identify any interferences between marketing plans, and generates a marketing plan relationship map. The following three differences are generated based on results of the comparison process performed by the marketing plan analyzer component.
   A. First order differences indicating effects of a single marketing plan.
   B. Second order differences comparing effects of two different marketing plans.
   C. Third order differences comparing effects of two pairs of marketing plans.

The following graph generation procedure by computing system 10:
1. Computing system 10 receives marketing plan specifications and populates the marketing plan specifications into a marketing plan specs database (e.g., database 12).
2. Computing system 10 receive marketing plan terminology (e.g., synonyms and antonyms).
3. Computing system 10 constructs and stores a marketing plan term ontology map.
4. Computing system 10 normalizes marketing plan terms and identifies marketing plan axes.
5. Computing system 10 constructs a subscriber social network before enabling a marketing plan.
6. Computing system 10 assigns a unique "style" to marketing plan.
7. Computing system 10 receives a list of marketing plan target subscribers.
8. Computing system 10 marks each marketing plan target with a marketing plan "style".
9. Computing system 10 enables a marketing plan (e.g., using sms, web, telemarketing, etc)
10. Computing system 10 constructs a subscriber social network after enabling a marketing plan.
11. Computing system 10 generates differential graphs as described, infra.
12. Computing system 10 receives and enables instructions to conduct one or more of the following analysis:
   A. Conduct a marketing plan structural analysis (using differential graphs) as described with respect to FIG. 2, infra.
   B. Conduct a temporal analysis (using differential graphs) as described with respect to FIG. 2, infra.
   C. Conduct interference analysis as described with respect to FIG. 2, infra.
   D. Construct a marketing plan relationship map graphically representing relationships among analyzed marketing plans as described with respect to FIG. 3, infra.

Generating Differential Graphs
1. Construct a social network graph (G1) before enabling a marketing plan (e.g., G1=weighted social network graph before enabling a marketing plan).
2. Construct social network graph (G2) after the enabling a marketing plan (e.g., G2=weighted social network graph after enabling a marketing plan).
3. Calculate a difference graph (DG) between the social network graphs (e.g., DG1=G2−G1 denoting a change in the social network).

differential graphs are not same as social network graphs
A social network graph comprises:
1. Customers/subscribers represented as nodes.
2. Activity/interaction between edges/lines between nodes.

A differential social network graph comprises:
1. Positive edges comprising a positive weight implying increased interaction between nodes.
2. Negative edges comprising a negative weight implying reduced interaction between nodes.

3. Old vertices indicating customers that have left the social network or customers who have not had any activity/interaction during the measured time period.
4. New vertices indicating new customers that have just joined the social network.

Figure 2:
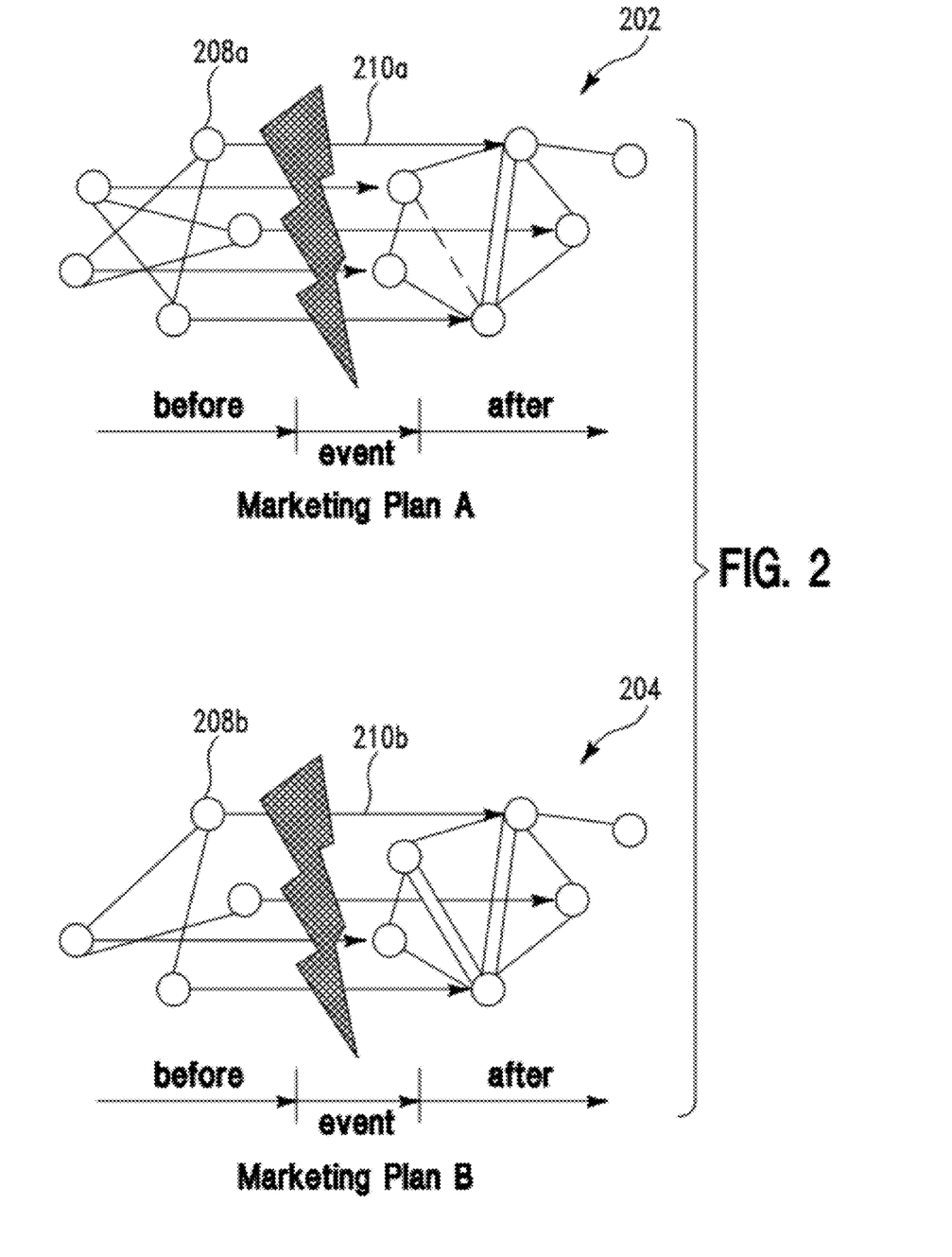
FIG. 2 illustrates differential graphs generated by the computing system of FIG. 1, in accordance with embodiments of the present invention.

FIG. 2 illustrates differential graphs 202 and 204 generated by computing system 10 of FIG. 1 and used for comparing an effectiveness of multiple social network marketing plans, in accordance with embodiments of the present invention. Differential graph 202 represents a (before and after view) graph associated with implementing a marketing plan A. Each node 208a represents a customer and each line 210a represents an interaction between customers. Differential graph 204 represents a (before and after view) graph associated with implementing a marketing plan A. Each node 208b represents a customer and each line 210b represents an interaction between customers. Differential graphs 202 and 204 are used to conduct the following analysis:

Structural Analysis

A structural analysis generates the following differences:
1. First order differences comprising a difference before and after enabling a single marketing plan and an analyses indicating the effect of a enabling a single marketing plan (e.g., what are the changes in a social network as a result of enabling marketing plan A?).
2. Second order differences comprising a difference between two 1st order difference graphs. The second order differences analyze of difference between enabling two marketing plans (e.g., how did enabling marketing plan A fare against enabling marketing plan B?).
3. Third order differences comprising a difference between two second order difference graphs. The third order differences analyze the difference between enabling pairs of marketing plans (e.g., is the difference between the effects of marketing plans A and B more than the difference between the effects of marketing plans C and D (i.e., not shown)).

Temporal Analysis

A temporal analysis enables the following example procedure:
1. Construct social network graphs G1, G2 . . . Gn at times t1, t2 . . . tn. A duration of time between snapshots does not have to be equal.
2. Calculate successive differential graphs as follows:
A. dG1=G2−G1
B. dG2=G3−G2
C. dGn=G[n+1]−Gn
3. Compare dG1, dG2, . . . dGn The aforementioned procedure enabled by the temporal analysis results in the following analysis and inference:
1. Increasing/decreasing differences between successive differential graphs correspond to an increasing/decreasing effect of a marketing plan.
2. dG1>dG2> . . . >dGn–Indicates a decreasing effect of the marketing plan.
3. dG1<dG2< . . . <dGn–Indicates an increasing effect of the marketing plan.
4. dG1=DG2= . . . =dGn–Indicates a continuous effect over the time period.
5. dG1=dG2= . . . =dGn=0–Indicates that a marketing plan has had no effect.

Interference Analysis

An interference analysis enables the following example procedure:
1. Construct a social network graph before enabling a marketing plan.
2. Assign an initial unique ID (e.g., a style) to each marketing plan.
3. Select target customers for the marketing plan.
4. Mark nodes in a social network graph corresponding to target customers with an associated style.
5. A target customer/node can be associated with multiple marketing plans running simultaneously.
6. Enable a marketing plan.
7. Assign final unique styles to customers that accepted/responded to the marketing plan.
8. Define thresholds (e.g., some, many, almost all).
9. Analyze relationships between the marketing plans based on initial and final styles & thresholds.

The aforementioned procedure enabled by the interference analysis results in the following analysis and inference:
1. Two marketing plans are competing when:
A. Both have many initial common targets OR
B. Most of their final targets are neighbors of each other AND
C. No customer has the same two markers.
2. Two marketing plans support each other when:
A. Many customers have the same two markers AND
B. Not many customers had the same two markers.
3. One marketing plan dominates another marketing plan when:
A. Both have many common neighbors AND
B. Most of them are of a dominant marker.
4. One marketing plan implies another marketing plan when:
A. Almost all customers of a marker 1 also have a marker 2 but there are many customers of marker 2 which are not marker 1.

Figure 3:
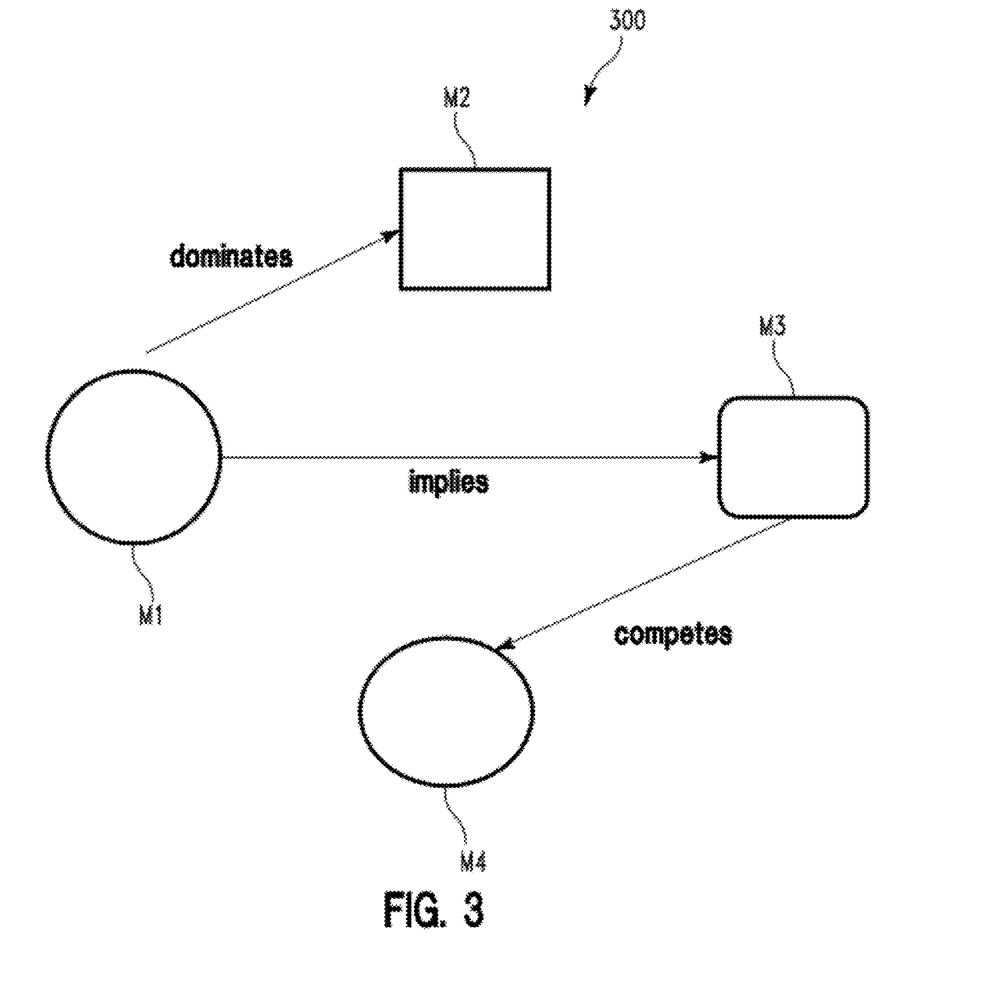
FIG. 3 illustrates a marketing plan relational map generated by the computing system of FIG. 1, in accordance with embodiments of the present invention.

FIG. 3 illustrates a marketing plan relational map 300 generated by computing system 10 of FIG. 1 and used for comparing an effectiveness of multiple social network marketing plans, in accordance with embodiments of the present invention. Marketing plan relational map 300 comprises a graphical representation of inter-relationships and interferences between marketing plans M1 . . . M4. Marketing plan relational map 300 is constructed using insights gathered from differential graph analysis and interference analysis as described, supra. Some relationships between implementing marketing plans comprise symmetric relationships and some relationships between implementing marketing plans comprise directional relationships.

Marketing plan relational map 300 results in the following analysis and inferences:
1. M1 implies M3 indicating that marketing plans may be merged into a single marketing plan and M4 and M1 may compete.
M1 dominates M2 indicating that M1 and M2 must not be offered together.
M4 competes with M3 indicating that customer targets could be consolidated and optimized and either M4 or M3 must be changed or withdrawn.

Figure 4:
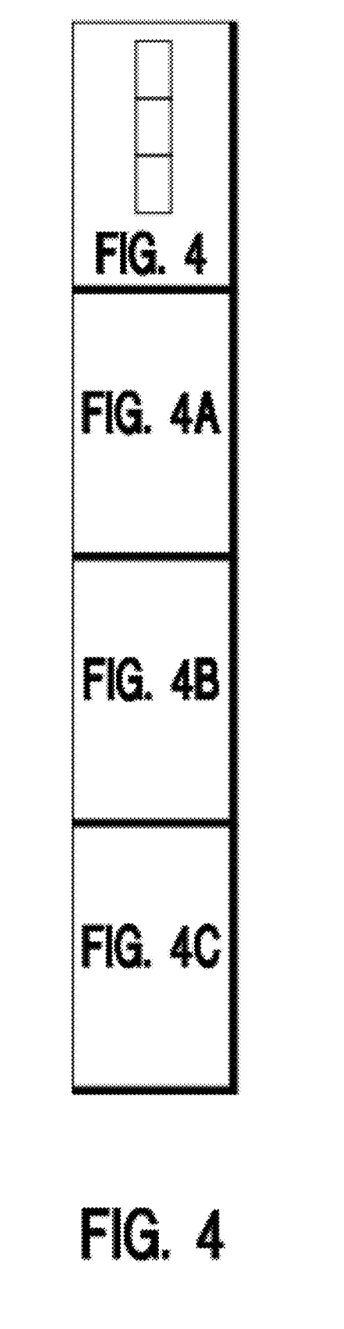
Figure 4A:
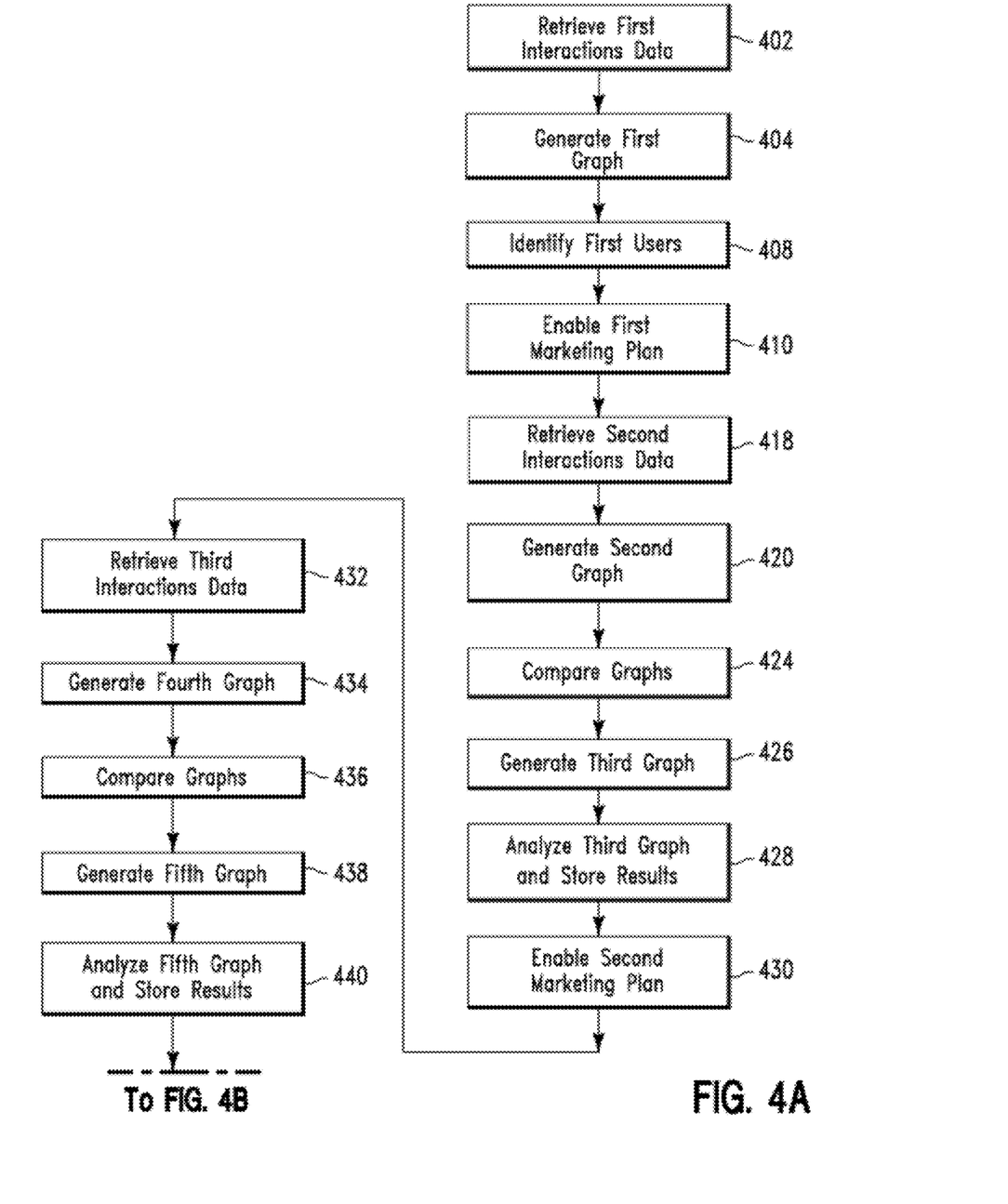
FIG. 4A, FIG. 4B, and FIG. 4C, illustrates a flowchart describing an algorithm used by the system of FIG. 1 for comparing an effectiveness of multiple social network marketing plans, in accordance with embodiments of the present invention.
Figure 4B:
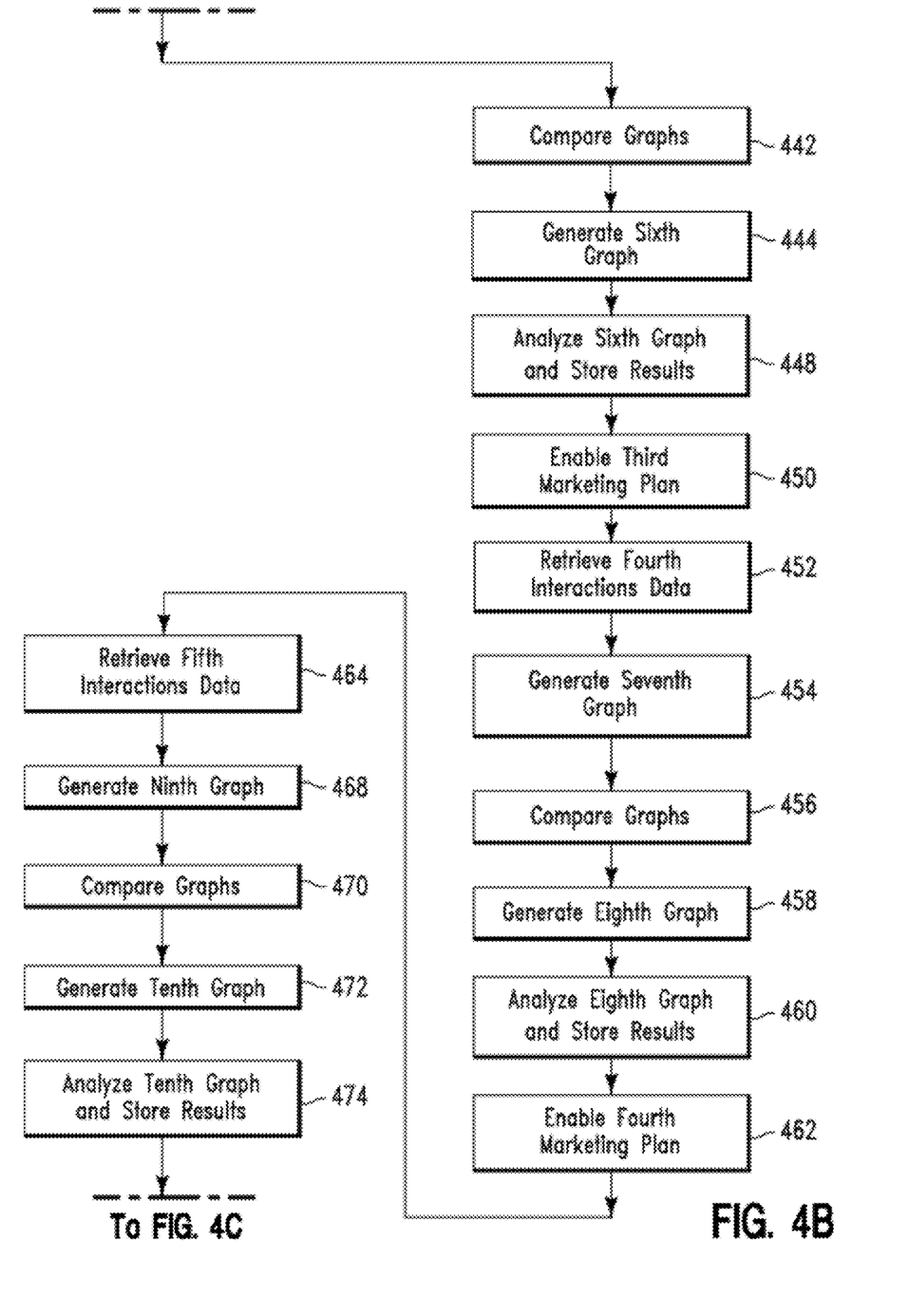
Figure 4C:
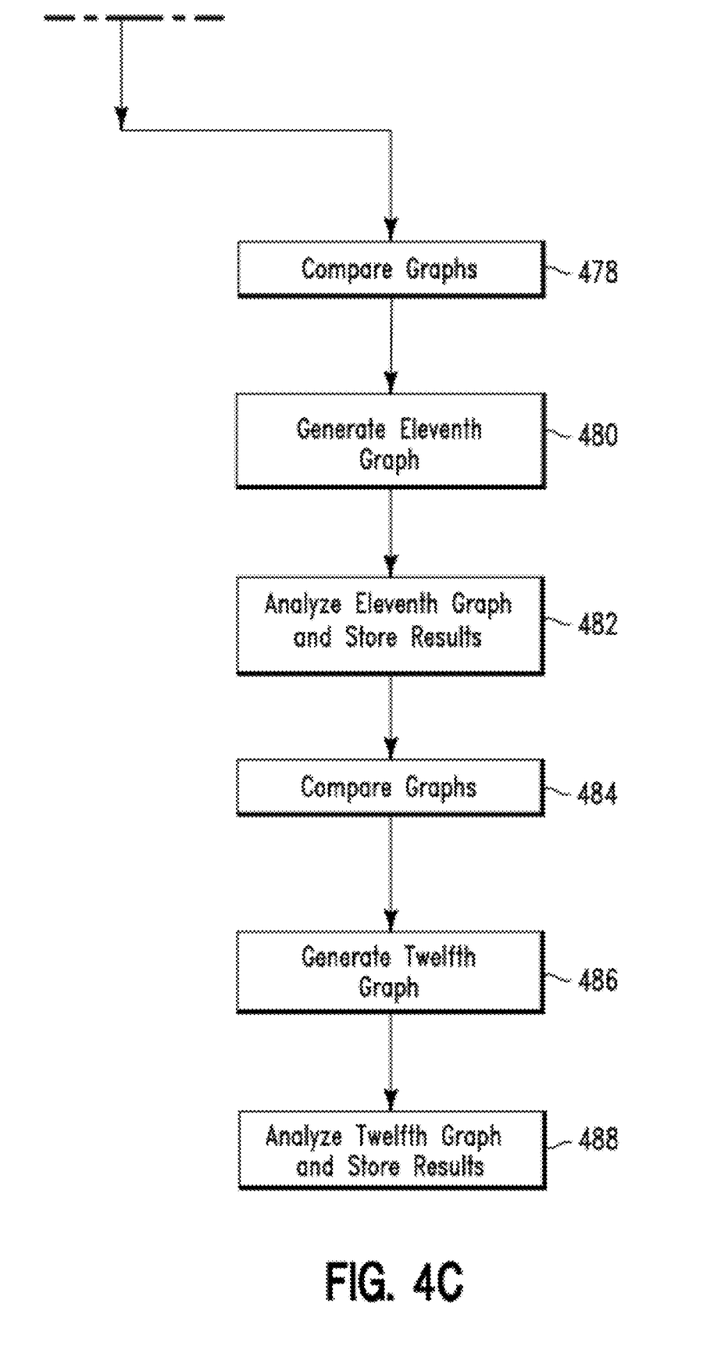

FIG. 4 including FIG. 4A, FIG. 4B, and FIG. 4C, illustrates a flowchart describing an algorithm used by system 5 of FIG. 1 for comparing an effectiveness of multiple social network marketing plans, in accordance with embodiments of the present invention. In step 402, a computing system (e.g., computing system 10 of FIG. 1), retrieves first data associated with first interactions between users associated with a plurality of social networks. In step 404, the computing system generates (i.e., based on the first data) a first graph illustrating the first interactions between the users. In step 408, the computing system identifies a group of users (i.e., of the users of step 402). The group of users comprises first targeted users associated with a first marketing plan associated with a first social network of the plurality of social networks. In step 410, the computing system enables the first marketing plan with respect to the users. In step 418, the computing system retrieves second data associated with second interactions between the users. In step 420, the computing system generates (i.e., based on the second data) a second graph illustrating the second interactions between the user. In step 424, the computing system compares the second graph to the first graph. In step 426, the computing system generates a third graph illustrating first order differences between the first interactions and the second interactions with respect to the group of users. In step 428, the computing system analyzes the third graph and stores results of the analysis. In step 430, the computing system enabling a second marketing plan (differing from the first marketing plan) with respect to the users. In step 432, the computing system retrieves third data associated with third interactions (i.e., resulting from implementing the second marketing plan) between the users. In step 432, the computing system generates (based on the third data) a fourth graph illustrating the third interactions between the users. In step 434, the computing system compares the first graph to the fourth graph. In step 436, the computing system generates (i.e., based on comparing the first graph to the fourth graph) a fifth graph illustrating first order differences between the first interactions and the third interactions with respect to the group of users. In step 440, the computing system analyzes the fifth graph; and storing results of analyzing the fifth graph. In step 442, the computing system compares the third graph to the fifth graph. In step 444, the computing system generates (based on comparing the third graph to the fifth graph) a sixth graph illustrating second order differences between the fifth graph and the third graph with respect to the group of users. In step 448, the computing system analyzes the sixth graph and storing results of the analysis. The results of the analysis of step 448, may indicate, inter alia, that:

1. The first marketing plan supports the second marketing plan.
2. The first marketing plan competes with the second marketing plan.
3. The first marketing plan dominates the second marketing plan.

In step 450, the computing system enables a third marketing plan (i.e., differing from the first and second marketing plans) with respect to the users. In step 452, the computing system retrieves fourth data associated with fourth interactions (i.e., resulting from implementing the third marketing plan) between the users. In step 454, the computing system generates (based on the fourth data) a seventh graph illustrating the fourth interactions between the users. In step 456, the computing system compares the first graph to the seventh graph. In step 458, the computing system generates (i.e., based on comparing the first graph to the seventh graph) an eighth graph illustrating first order differences between the first interactions and the fourth interactions with respect to the group of users. In step 460, the computing system analyzes the eighth graph and stores results of the analysis. In step 462, the computing system enables a fourth marketing plan (i.e., differing from the first, second, and third marketing plans) with respect to the users. In step 464, the computing system retrieves fifth data associated with fifth interactions (i.e., resulting from implementing the fourth marketing plan) between the users. In step 468, the computing system generates (based on the fifth data) a ninth graph illustrating the fifth interactions between the users. In step 470, the computing system compares the first graph to the ninth graph. In step 472, the computing system generates (based on comparing the first graph to the ninth graph) a tenth graph illustrating first order differences between the first interactions and the fifth interactions with respect to the group of users. In step 474, the computing system analyzes the tenth graph and stores results of the analysis. In step 478, the computing system compares the eighth graph to the tenth graph. In step 480, the computing system generates (i.e., based on comparing the eighth graph to the tenth graph) an eleventh graph illustrating second order differences between the eighth graph and the tenth graph) with respect to the group of users. In step 482, the computing system analyzes the eleventh graph and stores results of the analysis. In step 484, the computing system compares the sixth graph to the eleventh graph. In step 486, the computing system generates (i.e., based on comparing the sixth graph to the eleventh graph) a twelfth graph illustrating third order differences between the sixth graph and the eleventh graph with respect to the group of users. In step 488, the computing system analyzes the twelfth graph and stores results of the analysis.

Figure 5:
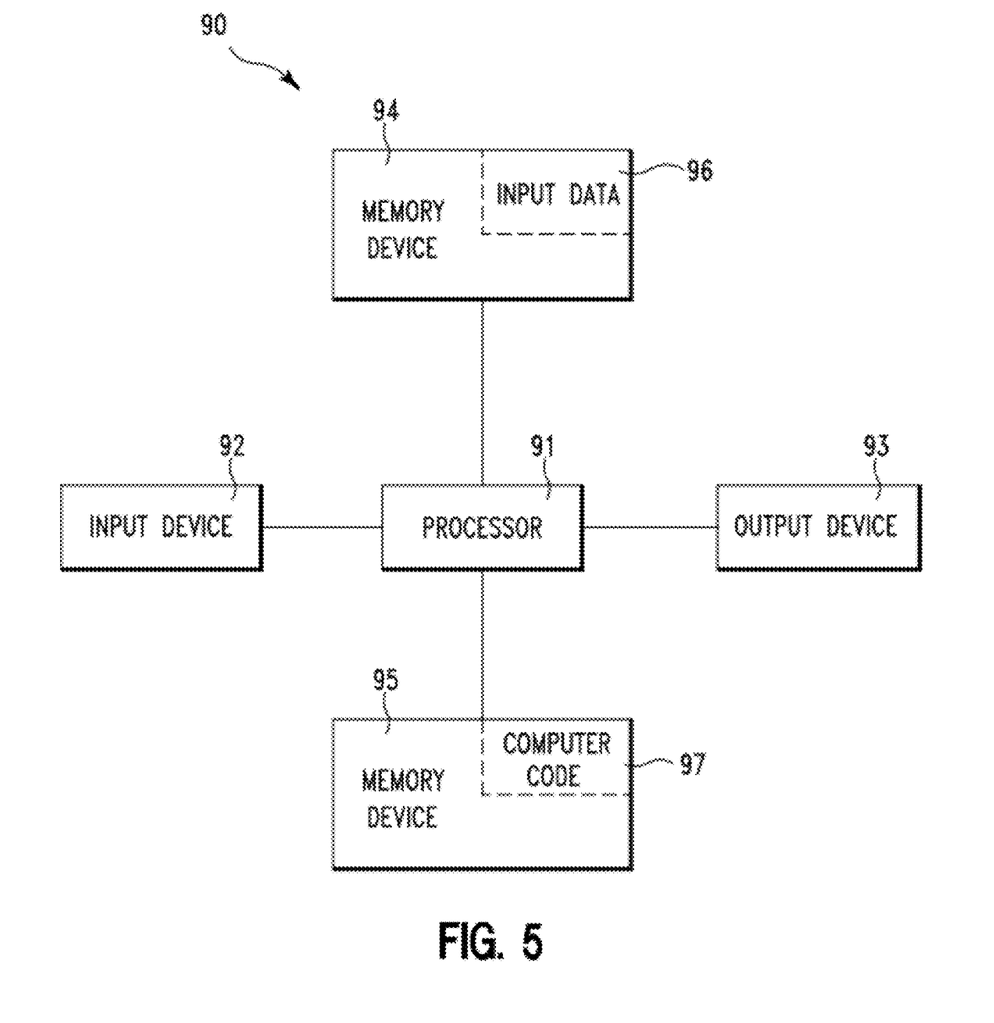
FIG. 5 illustrates a computer apparatus used comparing an effectiveness of multiple social network marketing plans, in accordance with embodiments of the present invention.

FIG. 5 illustrates a computer apparatus 90 (e.g., computing system 10 of FIG. 1) used comparing an effectiveness of multiple social network marketing plans, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIG. 4) comparing an effectiveness of multiple social network marketing plans. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithm of FIG. 4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or the program storage device).

Still yet, any of the components of the present invention could be created, integrated, hosted, maintained, deployed, managed, serviced, etc. by a service provider who offers to compare an effectiveness of multiple social network marketing plans. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method comparing an effectiveness of multiple social network marketing plans. In another embodiment, the invention provides a method that performs the process steps of the invention on a subscription, advertising, and/or fee basis. That is, a service provider, such as a Solution Integrator, could offer to compare an effectiveness of multiple social network marketing plans. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
retrieving, by a computer processor of a computing system, first data associated with first interactions between users associated with a plurality of social networks;
generating, by said computer processor based on said first data, a first graph illustrating said first interactions between said users;
identifying, by said computer processor, a group of users of said users, wherein said group of users comprise first targeted users associated with a first marketing plan associated with a first social network of said plurality of social networks;
first enabling, by said computer processor, said first marketing plan with respect to said users;
after performing said first enabling, retrieving by said computer processor, second data associated with second interactions between said users;
generating, by said computer processor based on said second data, a second graph illustrating said second interactions between said users;
comparing, by said computer processor, said second graph to said first graph;
generating, by said computer processor based on said comparing said first graph to said second graph, a third graph illustrating first order differences between said first interactions and said second interactions with respect to said group of users, wherein said first order differences indicate effects of said first marketing plan;
analyzing, by said computer processor, said third graph; and
storing, by said computer processor, results of said analyzing said third graph;
determining, by said computer processor, second order differences comparing effects between said first marketing plan and a second marketing plan differing from said first marketing plan;
determining, by said computer processor based on an ontology map, third order differences comparing effects between two different pairs of social network marketing plans;
standardizing, by said computer processor, terminology associated with specifications of said first marketing plan, said second marketing plan, and said two different pairs of social network marketing plans; and
performing, by said computer processor, an inference analysis with respect to said first marketing plan, said second marketing plan, said two different pairs of social network marketing plans, and said users, wherein said performing said inference analysis comprises:
assigning unique style IDs to said first marketing plan, said second marketing plan and said two different pairs of social network marketing plans;
associating nodes, representing targeted users of said users, with first specified IDs of said unique style IDs;
associating a group of nodes of said nodes, representing first users of said targeted users, with final specified IDs of said first specified IDs; and
defining thresholds associated with said first users.

2. The method of claim 1, wherein said group of users are associated with said second marketing plan associated with said first social network, and wherein said method further comprises:
second enabling, by said computer processor, said second marketing plan with respect to said users;
after performing said second enabling, retrieving by said computer processor, third data associated with third interactions between said users;
generating, by said computer processor based on said third data, a fourth graph illustrating said third interactions between said users;
comparing, by said computer processor, said first graph to said fourth graph;
generating, by said computer processor based on said comparing said first graph to said fourth graph, a fifth graph illustrating first order differences between said first interactions and said third interactions with respect to said group of users;
analyzing, by said computer processor, said fifth graph; and
storing, by said computer processor, results of said analyzing said fifth graph.

3. The method of claim 2, further comprising:
comparing, by said computer processor, said third graph to said fifth graph;
generating, by said computer processor based on said comparing said third graph to said fifth graph, a sixth graph illustrating second order differences between said fifth graph and said third graph with respect to said group of users;
analyzing, by said computer processor, said sixth graph; and
storing, by said computer processor, results of said analyzing said sixth graph.

4. The method of claim 3, further comprising:
determining, by said computer processor based on said results of said analyzing said sixth graph, that said first marketing plan supports said second marketing plan.

5. The method of claim 3, further comprising:
determining, by said computer processor based on said results of said analyzing said sixth graph, that said first marketing plan competes with said second marketing plan.

6. The method of claim 3, further comprising:
determining, by said computer processor based on said results of said analyzing said sixth graph, that said first marketing plan dominates said second marketing plan.

7. The method of claim 3, wherein said group of users are associated with a third marketing plan associated with said first social network, wherein said third marketing plan differs from said first marketing plan and said second marketing plan, and wherein said method further comprises:

third enabling, by said computer processor, said third marketing plan with respect to said users;

after performing said third enabling, retrieving by said computer processor, fourth data associated with fourth interactions between said users;

generating, by said computer processor based on said fourth data, a seventh graph illustrating said fourth interactions between said users;

comparing, by said computer processor, said first graph to said seventh graph;

generating, by said computer processor based on said comparing said first graph to said seventh graph, an eighth graph illustrating first order differences between said first interactions and said fourth interactions with respect to said group of users;

analyzing, by said computer processor, said eighth graph; and     storing, by said computer processor, results of said analyzing said eighth graph.

8. The method of claim 7, wherein said group of users are associated with a fourth marketing plan associated with said first social network, wherein said fourth marketing plan differs from said first marketing plan, said second marketing plan, and said third marketing plan, and wherein said method further comprises:

fourth enabling, by said computer processor, said fourth marketing plan with respect to said users;

after performing said fourth enabling, retrieving by said computer processor, fifth data associated with fifth interactions between said users;

generating, by said computer processor based on said fifth data, a ninth graph illustrating said fifth interactions between said users;

comparing, by said computer processor, said first graph to said ninth graph;

generating, by said computer processor based on said comparing said first graph to said ninth graph, an tenth graph illustrating first order differences between said first interactions and said fifth interactions with respect to said group of users;

analyzing, by said computer processor, said tenth graph; and     storing, by said computer processor, results of said analyzing said tenth graph.

9. The method of claim 8, further comprising:

comparing, by said computer processor, said eighth graph to said tenth graph;

generating, by said computer processor based on said comparing said eighth graph to said tenth graph, an eleventh graph illustrating second order differences between said eighth graph and said tenth graph with respect to said group of users;

analyzing, by said computer processor, said eleventh graph; and     storing, by said computer processor, results of said analyzing said eleventh graph.

10. The method of claim 9, further comprising:

comparing, by said computer processor, said sixth graph to said eleventh graph;

generating, by said computer processor based on said comparing said sixth graph to said eleventh graph, a twelfth graph illustrating third order differences between said sixth graph and said eleventh graph with respect to said group of users;

analyzing, by said computer processor, said twelfth graph; and     storing, by said computer processor, results of said analyzing said twelfth graph.

11. A process for supporting computer infrastructure, said process comprising providing at least one support service for at least one of creating, integrating, hosting, maintaining; deploying computer-readable code in a computing system, wherein the code in combination with said computing system is capable of performing support services upon being executed by a computer processor of said computing system; and performing said support services by implementing steps of:

retrieving, by said computer processor, first data associated with first interactions between users associated with a plurality of social networks;

generating, by said computer processor based on said first data, a first graph illustrating said first interactions between said users;

identifying, by said computer processor, a group of users of said users, wherein said group of users comprise first targeted users associated with a first marketing plan associated with a first social network of said plurality of social networks;

first enabling, by said computer processor, said first marketing plan with respect to said users;

after performing said first enabling, retrieving by said computer processor, second data associated with second interactions between said users;

generating, by said computer processor based on said second data, a second graph illustrating said second interactions between said users;

comparing, by said computer processor, said second graph to said first graph;

generating, by said computer processor based on said comparing said first graph to said second graph, a third graph illustrating first order differences between said first interactions and said second interactions with respect to said group of users, wherein said first order differences indicate effects of said first marketing plan;

analyzing, by said computer processor, said third graph; and storing, by said computer processor, results of said analyzing said third graph;

determining, by said computer processor, second order differences comparing effects between said first marketing plan and a second marketing plan differing from said first marketing determining, by said computer processor based on an ontology map, third order differences comparing effects between two different pairs of social network marketing plans;

standardizing, by said computer processor, terminology associated with specifications of said first marketing plan, said second marketing plan, and said two different pairs of social network marketing plans; and     performing, by said computer processor, an inference analysis with respect to said first marketing plan, said second marketing plan, said two different pairs of social network marketing plans, and said users, wherein said performing said inference analysis comprises:

assigning unique style IDs to said first marketing plan, said second marketing plan, and said two different pairs of social network marketing plans;

associating nodes, representing targeted users of said users, with first specified IDs of said unique style IDs;

associating a group of nodes of said nodes, representing first users of said targeted users, with final specified IDs of said first specified IDs: and defining thresholds associated with said first users.

12. A computer program product, comprising a computer readable storage device storing a computer readable program code, said computer readable program code configured to perform method upon being executed by a computer processor of said computing system, said method comprising:
    retrieving, by said computer processor, first data associated with first interactions between users associated with a plurality of social networks;
    generating, by said computer processor based on said first data, a first graph illustrating said first interactions between said users;
    identifying, by said computer processor, a group of users of said users, wherein said group of users comprise first targeted users associated with a first marketing plan associated with a first social network of said plurality of social networks;
    first enabling, by said computer processor, said first marketing plan with respect to said users;
    after performing said first enabling, retrieving by said computer processor, second data associated with second interactions between said users;
    generating, by said computer processor based on said second data, a second graph illustrating said second interactions between said users;
    comparing, by said computer processor, said second graph to said first graph;
    generating, by said computer processor based on said comparing said first graph to said second graph, a third graph illustrating first order differences between said first interactions and said second interactions with respect to said group of users, wherein said first order differences indicate effects of said first marketing plan;
    analyzing, by said computer processor, said third graph; and
    storing, by said computer processor, results of said analyzing said third graph;
    determining, by said computer processor, second order differences comparing effects between said first marketing plan and a second marketing plan differing from said first marketing plan;
    determining, by said computer processor based on an ontology map, third order differences comparing effects between two different pairs of social network marketing plans;
    standardizing, by said computer processor, terminology associated with specifications of said first marketing plan, said second marketing plan, and said two different pairs of social network marketing plans; and
    performing, by said computer processor, an inference analysis with respect to said first marketing plan, said second marketing plan, said two different pairs of social network marketing plans, and said users, wherein said performing said inference analysis comprises:
        assigning unique style IDs to said first marketing plan, said second marketing plan and said two different pairs of social network marketing plans;
        associating nodes, representing targeted users of said users, with first specified IDs of said unique style IDs;
        associating a group of nodes of said nodes, representing first users of said targeted users, with final specified IDs of said first specified IDs; and
        defining thresholds associated with said first users.

13. A computing system comprising a computer processor coupled to a computer-readable memory unit, said memory unit comprising instructions that when enabled by the computer processor implements a comparison method comprising:
    retrieving, by said computer processor, first data associated with first interactions between users associated with a plurality of social networks;
    generating, by said computer processor based on said first data, a first graph illustrating said first interactions between said users;
    identifying, by said computer processor, a group of users of said users, wherein said group of users comprise first targeted users associated with a first marketing plan associated with a first social network of said plurality of social networks;
    first enabling, by said computer processor, said first marketing plan with respect to said users;
    after performing said first enabling, retrieving by said computer processor, second data associated with second interactions between said users;
    generating, by said computer processor based on said second data, a second graph illustrating said second interactions between said users;
    comparing, by said computer processor, said second graph to said first graph;
    generating, by said computer processor based on said comparing said first graph to said second graph, a third graph illustrating first order differences between said first interactions and said second interactions with respect to said group of users, wherein said first order differences indicate effects of said first marketing plan;
    analyzing, by said computer processor, said third graph; and
    storing, by said computer processor, results of said analyzing said third graph;
    determining, by said computer processor, second order differences comparing effects between said first marketing plan and a second marketing plan differing from said first marketing plan;
    determining, by said computer processor based on an ontology map, third order differences comparing effects between two different pairs of social network marketing plans;
    standardizing, by said computer processor, terminology associated with specifications of said first marketing plan, said second marketing plan, and said two different pairs of social network marketing plans; and
    performing, by said computer processor, an inference analysis with respect to said first marketing plan, said second marketing plan, said two different pairs of social network marketing plans, and said users, wherein said performing said inference analysis comprises:
        assigning unique style IDs to said first marketing plan, said second marketing plan and said two different pairs of social network marketing plans;
        associating nodes, representing targeted users of said users, with first specified IDs of said unique style IDs;
        associating a group of nodes of said nodes, representing first users of said targeted users, with final specified IDs of said first specified IDs; and
        defining thresholds associated with said first users.

14. The computing system of claim 13, wherein said group of users are associated with said second marketing plan associated with said first social network, wherein said second marketing plan differs from said first marketing plan, and wherein said method further comprises:
    second enabling, by said computer processor, said second marketing plan with respect to said users;

after performing said second enabling, retrieving by said computer processor, third data associated with third interactions between said users;

generating, by said computer processor based on said third data, a fourth graph illustrating said third interactions between said users;

comparing, by said computer processor, said first graph to said fourth graph;

generating, by said computer processor based on said comparing said first graph to said fourth graph, a fifth graph illustrating first order differences between said first interactions and said third interactions with respect to said group of users;

analyzing, by said computer processor, said fifth graph; and storing, by said computer processor, results of said analyzing said fifth graph.

15. The computing system of claim 14, wherein said method further comprises:

comparing, by said computer processor, said third graph to said fifth graph;

generating, by said computer processor based on said comparing said third graph to said fifth graph, a sixth graph illustrating second order differences between said fifth graph and said third graph with respect to said group of users;

analyzing, by said computer processor, said sixth graph; and storing, by said computer processor, results of said analyzing said sixth graph.

16. The computing system of claim 15, wherein said method further comprises:

determining, by said computer processor based on said results of said analyzing said sixth graph, that said first marketing plan supports said second marketing plan.

17. The computing system of claim 15, wherein said group of users are associated with a third marketing plan associated with said first social network, wherein said third marketing plan differs from said first marketing plan and said second marketing plan, and wherein said method further comprises:

third enabling, by said computer processor, said third marketing plan with respect to said users;

after performing said third enabling, retrieving by said computer processor, fourth data associated with fourth interactions between said users;

generating, by said computer processor based on said fourth data, a seventh graph illustrating said fourth interactions between said users;

comparing, by said computer processor, said first graph to said seventh graph;

generating, by said computer processor based on said comparing said first graph to said seventh graph, an eighth graph illustrating first order differences between said first interactions and said fourth interactions with respect to said group of users;

analyzing, by said computer processor, said eighth graph; and storing, by said computer processor, results of said analyzing said eighth graph.

18. The computing system of claim 17, wherein said group of users are associated with a fourth marketing plan associated with said first social network, wherein said fourth marketing plan differs from said first marketing plan, said second marketing plan, and said third marketing plan, and wherein said method further comprises:

fourth enabling, by said computer processor, said fourth marketing plan with respect to said users;

after performing said fourth enabling, retrieving by said computer processor, fifth data associated with fifth interactions between said users;

generating, by said computer processor based on said fifth data, a ninth graph illustrating said fifth interactions between said users;

comparing, by said computer processor, said first graph to said ninth graph;

generating, by said computer processor based on said comparing said first graph to said ninth graph, an tenth graph illustrating first order differences between said first interactions and said fifth interactions with respect to said group of users;

analyzing, by said computer processor, said tenth graph; and storing, by said computer processor, results of said analyzing said tenth graph.

19. The computing system of claim 18, wherein said method further comprises:

comparing, by said computer processor, said eighth graph to said tenth graph;

generating, by said computer processor based on said comparing said eighth graph to said tenth graph, an eleventh graph illustrating second order differences between said eighth graph and said tenth graph with respect to said group of users;

analyzing, by said computer processor, said eleventh graph; and storing, by said computer processor, results of said analyzing said eleventh graph.

20. The computing system of claim 19, wherein said method further comprises:

comparing, by said computer processor, said sixth graph to said eleventh graph;

generating, by said computer processor based on said comparing said sixth graph to said eleventh graph, a twelfth graph illustrating third order differences between said sixth graph and said eleventh graph with respect to said group of users;

analyzing, by said computer processor, said twelfth graph; and storing, by said computer processor, results of said analyzing said twelfth graph.

* * * * *